United States Patent
Hu et al.

(10) Patent No.: US 11,661,898 B1
(45) Date of Patent: May 30, 2023

(54) SYSTEMS AND METHODS FOR EVAPORATIVE EMISSION PURGE CONTROL IN HYBRID VEHICLES

(71) Applicant: GM GLOBAL TECHNOLOGY OPERATIONS LLC, Detroit, MI (US)

(72) Inventors: Yiran Hu, Shelby Township, MI (US); Kee Y Kim, Ann Arbor, MI (US); Jacob Kyle Lobbestael, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/811,653

(22) Filed: Jul. 11, 2022

(51) Int. Cl.
*F02D 41/00* (2006.01)
*F02D 41/14* (2006.01)
*F02M 25/08* (2006.01)

(52) U.S. Cl.
CPC ....... *F02D 41/004* (2013.01); *F02D 41/0035* (2013.01); *F02D 41/1406* (2013.01); *F02M 25/0827* (2013.01); *F02D 2200/0406* (2013.01); *F02D 2200/1002* (2013.01); *F02D 2200/703* (2013.01)

(58) Field of Classification Search
CPC ............. F02D 41/0032; F02D 41/0035; F02D 41/004; F02M 25/08; F02M 25/0827
See application file for complete search history.

(56) References Cited

U.S. PATENT DOCUMENTS

| | | | |
|---|---|---|---|
| 5,778,867 A * | 7/1998 | Osanai | F02D 41/004 123/698 |
| 7,448,367 B1 | 11/2008 | Reddy et al. | |
| 9,309,824 B2 | 4/2016 | Kar | |
| 9,399,959 B2 | 7/2016 | Whitney et al. | |
| 10,119,481 B2 | 11/2018 | Livshiz et al. | |
| 10,486,681 B2 | 11/2019 | D'Amato et al. | |
| 11,312,208 B2 | 4/2022 | Sun et al. | |
| 2008/0308066 A1 * | 12/2008 | Martin | B60W 10/06 477/3 |

(Continued)

FOREIGN PATENT DOCUMENTS

DE 102009018260 B4 3/2014
DE 102020103899 A1 8/2021

*Primary Examiner* — Logan M Kraft
*Assistant Examiner* — Anthony L Bacon
(74) *Attorney, Agent, or Firm* — Lorenz & Kopf LLP (57) ABSTRACT

Evaporative emission purge control systems and methods use a cost factor to incentivize operation of an internal combustion at torques favorable for purge. An evaporative emission control system is configured to collect fuel vapor. A controller determines whether an operating speed of the internal combustion engine is within a target purge region that is bounded by a lower speed threshold and an upper speed threshold of the internal combustion engine. When the operating speed of the internal combustion engine is within the target purge region, the controller applies a cost factor to operating points for the internal combustion engine, and based on the cost factor, the operating points are set to include an operating torque for the internal combustion engine to generate an intake pressure of the internal combustion engine at a level below atmospheric pressure for a purge of the evaporative emission control system.

20 Claims, 5 Drawing Sheets

(56) References Cited

U.S. PATENT DOCUMENTS

| | | | |
|---|---|---|---|
| 2009/0292449 A1* | 11/2009 | Yamazaki | B60W 30/188 180/65.265 |
| 2013/0332015 A1* | 12/2013 | Dextreit | B60W 10/06 180/65.23 |
| 2015/0066265 A1* | 3/2015 | Martin | B60W 30/1882 477/3 |
| 2019/0178178 A1* | 6/2019 | Noh | F02D 41/0045 |
| 2021/0381453 A1* | 12/2021 | Nakagawa | F02M 25/0836 |

* cited by examiner

SYSTEMS AND METHODS FOR EVAPORATIVE EMISSION PURGE CONTROL IN HYBRID VEHICLES

INTRODUCTION

The present disclosure relates to evaporative emission (EVAP) control systems and methods for gasoline powered vehicles. More particularly, the disclosure relates to EVAP systems and methods that employ effective purge control for EVAP systems in vehicles with hybrid propulsion systems, including those with boosted engines, and those without active purge pumps.

Internal combustion engines convert fuel and air to various compounds while extracting energy to perform intended functions, such as propelling a vehicle. Those engines that operate on using a fuel, such as gasoline, that tends to create vapor, include EVAP systems that collect the vapor arising from sources such as the fuel tank, filler pipe and conduit system. The collected vapor may be stored in a canister containing an adsorbent such as activated carbon or another appropriate material which holds the vapor for later release during a purge of the EVAP system, where the collected vapors are transferred to the engine for consumption. The purge cycle replenishes the storage capacity of the adsorbent. In vehicles with only internal combustion engines, providing the propulsion power, operation of the engine over typical drive cycles provides ample opportunities to initiate and run purge cycles to clear the vapor from the EVAP system.

Hybrid vehicles employ both an internal combustion engine and an electric motor to provide the propulsion power needed to meet operation demands. Given the two power options, control approaches may be implemented that enable highly efficient operation of the overall hybrid system and of its power sources. As a result, an internal combustion engine in a hybrid powertrain may be operated to only provide a portion of the drive torque required and therefore, may be operated within a relatively narrow but efficient operating range. This relatively narrow operating range may limit the opportunities to conduct effective EVAP purge cycles.

Accordingly, it is desirable to provide effective systems and methods for EVAP purge in vehicles having engines operating under conditions that limit EVAP purge opportunities, such as in hybrid vehicles. Furthermore, other desirable features and characteristics of the present disclosure will become apparent from the subsequent detailed description and the appended claims, taken in conjunction with the accompanying drawings and the foregoing technical field and background.

SUMMARY

Evaporative emission purge control systems and methods use a cost factor to incentivize operation of an internal combustion engine at torques favorable for purge. An evaporative emission control system is configured to collect fuel vapor. A controller determines whether an operating speed of the internal combustion engine is within a target purge region that is bounded by a lower speed threshold and an upper speed threshold of the internal combustion engine. When the operating speed of the internal combustion engine is within the target purge region, the controller applies a cost factor to select operating points for the internal combustion engine based on the cost factor. The operating points are set to include an operating torque for the internal combustion engine to generate an intake pressure of the internal combustion engine at a level below atmospheric pressure for a purge of the evaporative emission control system.

In additional embodiments, an atmospheric pressure sensor is coupled with the controller. The operating torque is set so that the intake pressure is lower than a barometric pressure sensed by the atmospheric pressure sensor.

In additional embodiments, the controller sets, when the operating speed is not within the target purge region, the operating torque to maximize fuel efficiency of the internal combustion engine; and selects, when applying the cost factor and the operating torque to enable purge, the cost factor to optimize against all cost function costs, including fuel efficiency.

In additional embodiments, a purge valve is disposed to control a flow from the evaporative emission control system to an intake system of the internal combustion engine. The controller opens the purge valve when the operating speed is within the target purge region and the intake pressure is effective for a purge of the evaporative emission control system.

In additional embodiments, the controller determines whether a diagnostic check of the evaporative emission control system is indicated. When the diagnostic check is indicated, the controller sets the operating torque for the internal combustion engine to result in the intake pressure at the level for a purge of the evaporative emission control system, independent of the operating speed.

In additional embodiments, the operating torque is set based on a cost function, wherein the operating torque is set to result in the intake pressure being too high for a purge of the evaporative emission control system when a precedential cost factor takes precedence over a purge incentivizing cost factor.

In additional embodiments, the purge incentivizing cost factor is weighted to incentivize purge of the evaporative emission control system, wherein the precedential cost factor is weighted to result in stable operation of the internal combustion engine.

In additional embodiments, a boost device operates to selectively increase the intake pressure. The controller operates the boost device only when the operating speed is outside the target purge region.

In additional embodiments, the internal combustion engine is included in the vehicle propulsion system. An electric machine is also included in the vehicle propulsion system. The controller apportions an overall torque of the propulsion system between the electric machine and the internal combustion engine.

In additional embodiments, the controller sets the operating torque at a constrained level when the operating speed is within the target purge region, wherein the constrained level is set to lower the operating torque to decrease the intake pressure.

In a number of additional embodiments, a method of controlling evaporative emission purge, includes determining, by a controller, whether an operating speed of an internal combustion engine is within a target purge region of an evaporative emission control system configured to collect fuel vapor. The target purge region is bounded by a lower speed threshold of the internal combustion engine and an upper speed threshold of the internal combustion engine. When the operating speed of the internal combustion engine is within the target purge region, the controller applies a cost factor to operating points for the internal combustion engine. When an operating speed of the internal combustion engine is within the target purge region and based on the cost factor, the operating points are set to include an operating torque for the internal combustion engine to generate an intake pressure of the internal combustion engine at a level below atmospheric pressure for an effective purge of the evaporative emission control system.

In additional embodiments, the controller, with an input from an atmospheric pressure sensor, sets the operating torque so that the intake pressure generated is lower than a barometric pressure sensed by the atmospheric pressure sensor.

In additional embodiments, the controller, when the operating speed is not within the target purge region, sets the operating torque to maximize fuel efficiency of the internal combustion engine.

In additional embodiments, a purge valve controls a flow from the evaporative emission control system to an intake system of the internal combustion engine. The controller operates the purge valve when the operating speed is within the target purge region and the intake pressure is effective for a purge of the evaporative emission control system.

In additional embodiments, the controller determines whether a diagnostic check of the evaporative emission control system is indicated. When the diagnostic check is indicated and independent of the operating speed, the controller sets the operating torque for the internal combustion engine to result in the intake pressure being effective for a purge of the evaporative emission control system.

In additional embodiments, the controller determines, based on a cost function, the operating torque, and determines whether a precedential cost factor takes precedence over a purge incentivizing cost factor. The controller sets, when the precedential cost factor takes precedence over the purge incentivizing cost factor, the operating torque to result in the intake pressure being ineffective for a purge of the evaporative emission control system.

In additional embodiments, the purge incentivizing cost factor is weighted to incentivize purge of the evaporative emission control system and the precedential cost factor is weighted to result in stable operation of the internal combustion engine.

In additional embodiments, a boost device selectively increases the intake pressure. The controller operates the boost device only when the operating speed is outside the target purge region.

In additional embodiments, the internal combustion engine is included in a vehicle propulsion system that also includes an electric machine. The controller apportions an overall torque of the propulsion system between the electric machine and the internal combustion engine.

In a number of other embodiments, an evaporative emission purge control system includes an internal combustion engine operated at an operating torque within a range of torques and at an operating speed within a range of speeds. The internal combustion engine has an intake system having an intake pressure. A fuel system is coupled with the internal combustion engine. An evaporative emission control system is coupled with the fuel system to collect fuel vapor. A controller determines whether a diagnostic check of the evaporative emission control system is indicated; determines whether a purge of the evaporative emission control system is indicated; and determines whether the operating speed is within a target purge region. When the diagnostic check is indicated and independent of the operating speed, the controller sets the operating torque for the internal combustion engine to result in the intake pressure being effective for a purge of the evaporative emission control system. When the purge of the evaporative emission control system is indicated and the operating speed is within the target purge region, the controller sets the operating torque for the internal combustion engine to generate the intake pressure at a level effective for a purge of the evaporative emission control system.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term engine refers to an internal combustion engine and the term motor refers to an electrical machine that may operate as a motor and/or a generator. The term hybrid powertrain refers to a vehicle propulsion system that employs both an engine and a motor. Also as used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of EVAP systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
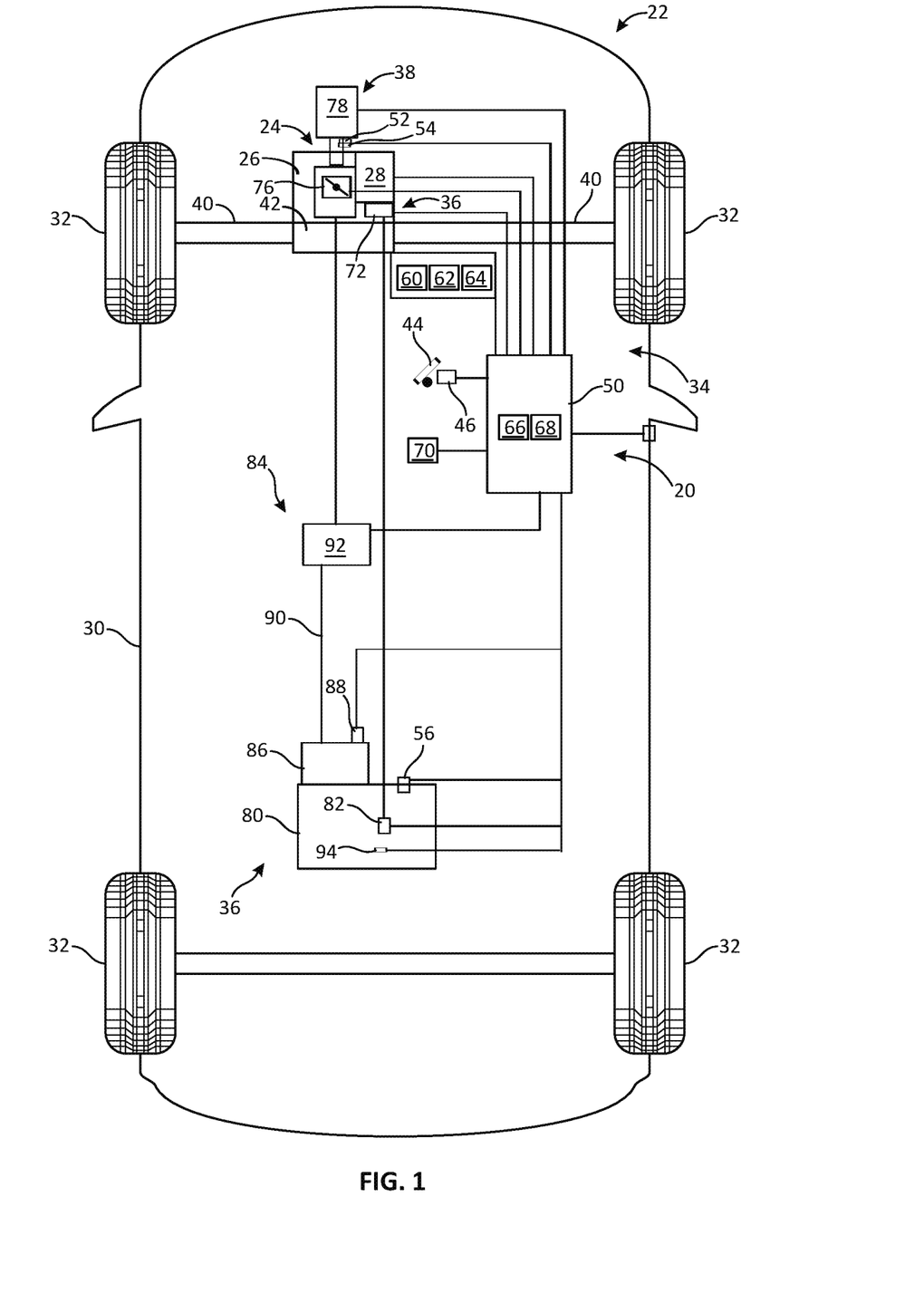
FIG. 1 is a schematic illustration of a vehicle having an evaporative emission purge control system, in accordance with various embodiments.

Referring to FIG. 1, in a number of embodiments, an EVAP purge control system 20 may be included in a vehicle 22. The vehicle 22 may be any one of a number of different types of land, sea, or air vehicles, and in certain embodiments, may for example, be a passenger automobile of any configuration. As depicted in FIG. 1, the vehicle 22 may be a hybrid vehicle with a propulsion system 24 that includes an internal combustion engine 26 and an electric machine 28. The vehicle 22 may also include, any, or any combination of: a body 30, wheels 32, an electronic control system 34, and other systems such as a steering system, a braking system and other systems, which are not illustrated. The wheels 32 may each be rotationally coupled to the body 30. In various embodiments the vehicle 22 may differ from that depicted in FIG. 1. For example, in certain embodiments the number of wheels 32 and/or the body style may vary.

In the embodiment illustrated in FIG. 1, the propulsion system 24 supplies torque to drive the wheels 32. The electronic control system 34 apportions the torque to one or both of the internal combustion engine 26 and the electric machine 28 in a hybrid system. The electronic control system 34 normally maximizes efficiency of the propulsion system 24 and apportions overall torque requirements for that reason, including to maximize fuel economy of the internal combustion engine 26 by its operating torque. In apportioning torque the electronic control system 34 may use a cost-based approach where a cost function is used to make determinations.

With inclusion of the electric machine 28, the vehicle 22 is an electrified vehicle. In a number of examples, the electric machine 28 may be a device such as a motor, a motor-generator, and/or a plural number of motors or motor-generators. The electric machine 28 may be powered by a power source such as a rechargeable energy storage system (not illustrated), which in a number of examples may be a battery or batteries. The internal combustion engine 26 may be powered by a source such as fuel from a fuel system 36 and air from an intake system 38.

In a number of embodiments, the electronic control system 34 may include variations of components or modules that may be packaged together, or distributed to various locations of the vehicle 22. For example, the electronic control system 28 may include an engine control module, a body control module, a transmission control module, a battery management module, a vehicle integration control module, and/or one or more other components to control a system, function or operation, of the vehicle 22. The electronic control system 34 may also include a hybrid control module, an EVAP control module and a purge control module as further described below. While the components of the electronic control system 34 are depicted as being part of the same system, it will be appreciated that in certain embodiments, these features may comprise multiple systems and any number of individual controllers may be employed.

The propulsion system 24 may be coupled with at least some of the wheels 32 through one or more drive shafts 40.

In some examples, the propulsion system 24 may include a transmission 42 to provide variable output from the internal combustion engine 26 and/or the electric machine 28. In a number of examples, the electric machine 28 may, or may not be, coupled to the transmission 42. In some embodiments, the transmission 42 may not be necessary, and may be omitted. Accordingly, torque generated by the internal combustion engine 26 and/or the electric machine 28 is transferred to the wheels through the drive shafts 40 either directly or through the transmission 42. A driver of the vehicle 22 may provide inputs via an accelerator pedal 44 to command a desired speed or acceleration of the vehicle 22 available to the electronic control system 34 via a throttle position sensor 46. Response of the vehicle 22 to these inputs may be effected, at least in part, through an output speed and/or torque of the internal combustion engine 26 and/or of the electric machine 28. In certain embodiments acceleration of the vehicle 22 may be commanded by a computer instead of by a driver, such as through an autonomous capability. Accordingly, operating points of the internal combustion engine 26 include an operating torque and an operating speed.

The electronic control system 34 includes a controller 50 that may receive various signals from sensors and send control signals to various actuators for operation of the vehicle 22 and its various systems. The sensors are devices that sense observable conditions of, or related to, the vehicle 22 and in the current embodiment include the throttle position sensor 46 at the pedal 44, a mass airflow (MAF) sensor 52, a manifold absolute pressure (MAP) sensor 54, a fuel tank pressure sensor 56 and an atmospheric (barometric) pressure sensor 58. The sensors of the propulsion system 24 may include other typical sensors such as an intake air temperature sensor 60, an engine speed (crank position) sensor 62, a coolant temperature sensor 64, and additional sensors as needed.

In the depicted embodiment, the controller 50 includes a processor 66 and a memory device 68, and is coupled with a storage device 70. The processor 66 performs the computation and control functions of the controller 50, and may comprise any type of processor or multiple processors, single integrated circuits such as a microprocessor, or any suitable number of integrated circuit devices and/or circuit boards working in cooperation to accomplish the functions of a processing unit. During operation, the processor 66 executes one or more programs and may use data, each of which may be accessed from the storage device 70 and as such, the processor 66 controls the general operation of the controller 50 in executing the processes described herein, such as the processes described further below in connection with FIG. 5.

The memory device 68 may be any type of suitable memory. The memory device 68 may store the above-referenced programs along with one or more stored values of the data such as for short-term data access. The storage device 70 stores data, such as for long-term data access for use in automatically controlling the vehicle 22 and its related systems including of the propulsion system 24, and including the EVAP purge control system 20. The storage device 70 may be any suitable type of storage apparatus. In one exemplary embodiment, the storage device 70 comprises a source from which the memory device 68 receives the programs that execute one or more embodiments of one or more processes of the present disclosure, such as the steps of the process (and any related processes thereof) described herein and further below in connection with FIG. 5. In another exemplary embodiment, the programs may be directly stored in and/or otherwise accessed by the memory device 68.

The programs represent executable instructions, used by the controller 50 and may include one or more separate programs, each of which comprises an ordered listing of executable instructions for implementing logical functions. The instructions, when executed by the processor 66 support the receipt and processing of signals such as from the various sensors, and the performance of logic, computations, methods and/or algorithms for automatically controlling the components and systems described herein. The processor 66 may generate control signals of the electronic control system 34, such as to automatically control various components and systems of the vehicle 22, based on the logic, calculations, methods, and/or algorithms.

The controller 50 commands an amount of fuel to be delivered to the internal combustion engine 26 through the fuel system 36, which includes fuel injectors 72 for metering fuel into the cylinders of the internal combustion engine 26. Each device that varies a parameter of the vehicle 22 is referred to as an actuator. Accordingly, the fuel injectors 72 comprise actuators of the vehicle 22. A fuel-to-air ratio is the mass of fuel being delivered to the internal combustion engine 26 over the mass of air being delivered to the internal combustion engine 26. The amount of fuel commanded, generally correlates to the amount needed for stoichiometric operating conditions given the current operating state of the vehicle 22. Stoichiometric operation supplies the precise amount of air needed to result in complete burning of the fuel delivered to the cylinders of the internal combustion engine 26 for converting all of the delivered fuel to carbon dioxide and water. Accordingly, operation of the internal combustion engine 26 generally involves supplying a precise amount of fuel supplied through the fuel system 36 in proportion to the air supplied through the intake system 38, and to maximize efficient operation.

The intake system 38 includes a throttle valve 76 for controlling air supplied to the internal combustion engine 26. The throttle valve 76 comprises another actuator of the vehicle 22. The intake system 38 also includes a boost device 78 to increase pressure in the intake system 38. In the current embodiment, the boost device 78 is a turbocharger driven by exhaust from the internal combustion engine 26. In other embodiments, the boost device may comprise a supercharger driven through a gearset by the internal combustion engine 26, an electric turbine, or another type of system that selectively increases pressure in the intake system 38.

The fuel system 36 includes the fuel injectors 72 supplied with fuel from a fuel tank 80 by a fuel pump 82. The fuel system 36 also includes an EVAP system 84 for containing and using vaporized fuel. The EVAP system 84 includes a canister 86 for collecting fuel vapor, which may contain an adsorbent to hold and release the vapor. The canister 86 includes a vent valve 88 operable to normally open the interior of the canister 86 to atmosphere, and may be closed for certain purposes such as diagnosing the EVAP system 84. When the vent valve 88 is open, the adsorbent prevents the escape of fuel vapor. The canister 86 is coupled with the intake system 38 through a conduit 90 that includes a purge valve 92. The purge valve 92 may comprise a solenoid operated, normally closed valve that is selectively opened to couple the interior of the canister 86 with the intake system 38 to draw vapor from the canister 86, and other parts of the EVAP system 84, for consumption in the internal combustion engine 26. The purge valve 92 may be opened when operating conditions of the internal combustion engine 26 are correct for a vapor purge. The vent valve 88 may be open during purge to allow fresh air to enter the canister 86. The electronic control system 34 controls the EVAP system 84 including the vent valve 88 and the purge valve 92, with at least a part of the control being carried out by the EVAP purge control system 20. In the current embodiment, the EVAP purge control system 20 is shown as a part of the electronic control system 34 of the vehicle 22. In other embodiments, the EVAP purge control system 20 may be a separate system that communicates with the electronic control system 34. While purge of the EVAP system 84 may be necessary, it has been discovered as part of the current disclosure that forcing purge cycles in applications with a hybrid electric powertrain may lead to undesirable efficiency reductions.

The controller 50 determines when to initiate a purge of the canister 86. When the operating conditions of the internal combustion engine 26 are correct for purge, the controller 50 commands the purge valve 92 to open, such as by operating its solenoid. Opening the purge valve 92 to the intake system 38 during such correct operating conditions creates a vacuum that pulls fresh air through the vent valve 88 and the canister 86. Stored fuel vapors are routed to the internal combustion engine 26 and consumed during the combustion process. The electronic control system 34 may be programmed to initiate a purge cycle during suitable periods of operation, such as when the internal combustion engine 26 is capable of accommodating purged fuel vapor in the intake system 38 without upsetting the fuel/air balance and without creating unstable engine operation. As further described below, effective purge cycles of the EVAP system 84 are optimized through the use of an incremental cost function to incentivize operation of the internal combustion engine 26, including in the propulsion system 24 with electric machine 28, at operating points that support purge.

The electronic control system 34 may perform diagnostics to evaluate the EVAP system 84 for correct operation. Ongoing monitoring may be performed to look for signs of leaks and improper system operation. Monitoring may use inputs from the pressure sensor 56, from a fuel level sensor 94, from the purge vale 92, from the vent valve 86, and from other sources such as the internal combustion engine 26 which may indicate unexpected inputs into the fuel/air balance. The inputs may be compared to reference values stored in memory. In some embodiments, a temperature sensor may also be included in the fuel tank 80 for context. When monitoring results in an alert that diagnostic testing of the EVAP system 84 is needed, the electronic control system 34 initiates a diagnostic strategy that may vary, depending on the type of vehicle 22. For example, the diagnostics may include a leak test where the vent valve 88 is closed and the purge valve 92 is opened, creating a vacuum in the EVAP system 84. The pressure sensor 56 is monitored to verify whether the system holds the generated vacuum. If the vacuum indicated by the pressure sensor 56 is lower than an expected stored value, a fault is indicated. It will be appreciated that a sufficient vacuum is needed from the intake system 38 to conduct the diagnostic check. While in the current embodiment the diagnostics use a vacuum decay approach, in other embodiments the system may be pressurized and pressure decay monitored. It will be appreciated that the diagnostics may include other routines for evaluating the EVAP system 84. For example, with the internal combustion engine 26 running, throttle position and load may be used to determine the amount of fuel being displaced by the fuel pump 82, which along with the amount of pressure drawn from the system, may be used to evaluate leaks.

Figure 2:
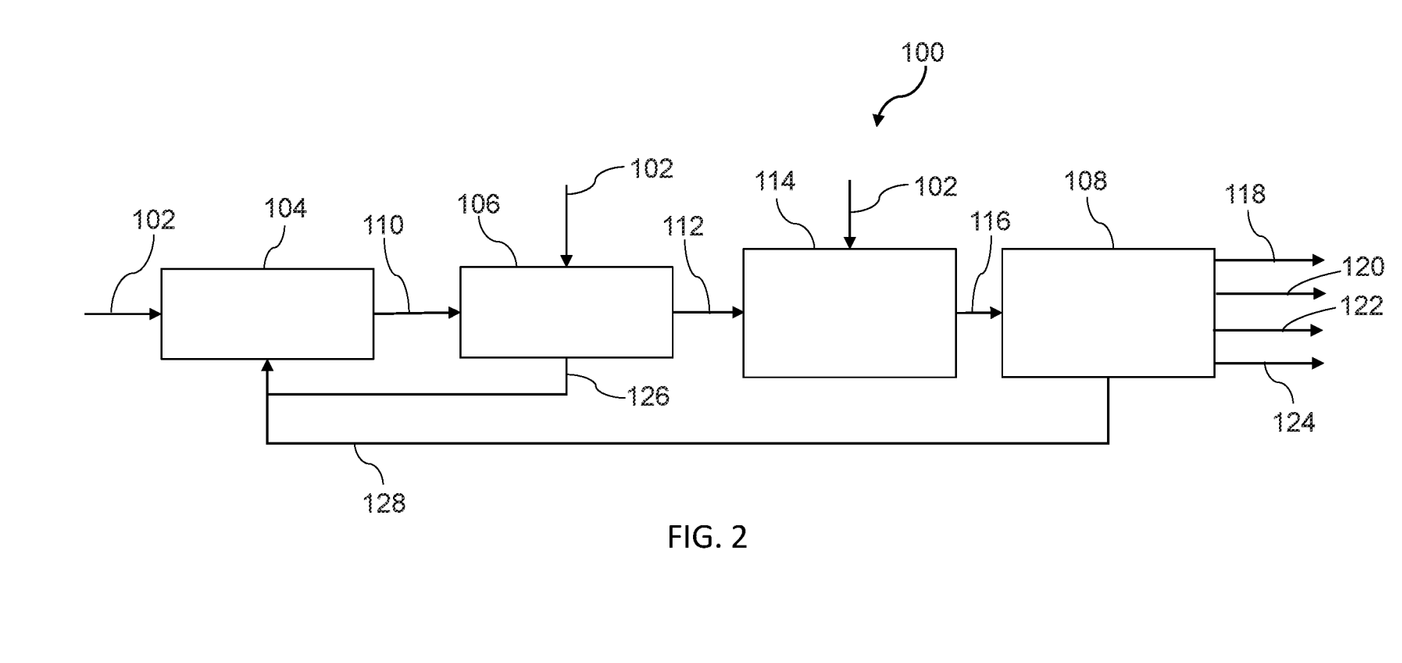
FIG. 2 is a diagram of a part of the evaporative emission purge control system of FIG. 1, in accordance with various embodiments.

Referring to FIG. 2 a general overview of a control architecture 100 of the electronic control system 34 is illustrated showing setting operating points of the internal combustion engine 26. The aspects of the control architecture may be carried out by the controller 50 and specifically the processor 66 thereof. In embodiments, the aspects of the control architecture 100 may be carried out by an EVAP system controller, a hybrid controller, and an engine controller operating in coordination. Sensor inputs 102 are provided to the EVAP control module 104. Sensor inputs 102 may include data from the pressure sensor 56 indicating pressure in the fuel tank 80, from the fuel level sensor 94 and other sensors such as a fuel temperature sensor and purge flow sensor (which may be integrated into the purge valve 92). The EVAP control module 104 may also access data such as on operation of the purge valve 92, the vent valve 88 and past purge timing, such as may be stored in memory of the controller 50.

In the current embodiment, EVAP purge operation is subject to additional control steps as further described below, and so the EVAP control module 104 does not directly effect purge cycles without feedback 126, 128 respectfully, from the purge control module 106 on the purge routine strategy to be employed, and from the engine control module 108 on the operating state of the engine 26. The EVAP control module 104 may determine that a purge cycle is indicated, and/or that a diagnostic cycle is indicated, and may obtain data on EVAP state. The EVAP control module 104 delivers, via a signal 110, the data and determinations to the purge control module 106, which determines the purge strategy to be implemented, as further described below.

The purge control strategy is communicated by the purge control module 106 via a signal 112 to the hybrid control module 114, which determines optimal operating points for the electric machine 28 and the internal combustion engine 26. As a hybrid vehicle, the vehicle 22 including with the boost device 78 and without an active purge pump, typically applies operating point selection optimization for the internal combustion engine 26 that optimizes vehicle fuel consumption. Fuel economy optimization may not provide sufficient opportunities for purging of the EVAP system 84. Under normal conditions, the internal combustion engine 26 may operate at intake system 38 pressures approximately at, or above, atmospheric pressure where purging without an active pump is not effective. Accordingly, operating point selection for the internal combustion engine 26 is tailored to support purge opportunities by incorporating additional cost into the optimization routine, where the additional cost incentivizes provide more purging opportunities. The opportunities are targeted to regions of operation of the internal combustion engine 26 where it is most efficient to do so, thereby ensuring the vehicle 22 meets emission goals while also obtaining maximum, or near maximum, fuel economy. The added layer of soft cost seamlessly integrates with intrusive purging with hard constraints for conditions such as providing diagnostics of the EVAP system 84.

The operating points selected for the internal combustion engine 26 are communicated, via a signal 116 to the engine control module 108 to execute operation of the internal combustion engine 26 to result in an operating torque and an operating speed. For example, the engine control module sets the position of the throttle valve 76 via a signal 118, sets operation of the fuel injectors 72, via a signal 120, sets operation of the boost device 78, via a signal 122, and sets other actuators such as for valve operation, spark timing and others via a representative signal 124. In embodiments, the purge control module 106 and the hybrid control module 114 may reside in a hybrid controller of the vehicle 22, the engine control module 108 may reside in an engine controller of the vehicle 22 and the EVAP control module may reside in an EVAP controller of the vehicle 22.

In order to conduct an effective purge cycle, a sufficient delta-pressure ($\Delta P$), is needed between the intake manifold pressure, such as indicated by the MAP sensor 54, and the barometric pressure, such as indicated by the atmospheric pressure sensor 58. It will be notable that the EVAP system 84 does not include an active pump to draw vacuum but instead relies on the draw of the intake system 38. During a normal drive cycle of a non-electrified vehicle with an internal combustion engine, ample operational opportunities arise for purge during normal drive cycles where intake manifold pressure varies significantly. It has been found that efficiency optimization of the propulsion system 24, such as controlled by the hybrid control module 114, results in little to no purge opportunities where the operating points of the internal combustion engine 26 result in a sufficient $\Delta P$. For example, the hybrid control module 114 maximizes efficiency and selects operating points for the internal combustion engine 26 that have low pumping losses and that concomitantly result in intake manifold pressure and atmospheric pressure that are close to one another. When the boost device 78 is operated, the intake manifold pressure routinely surpasses the atmospheric pressure. Operating the internal combustion engine 26 in such a manner is possible because the electric machine 28 is operated to fill in the torque required to meet the operate requested torque while operating the internal combustion engine 26 at optimum efficiency.

Figure 3:
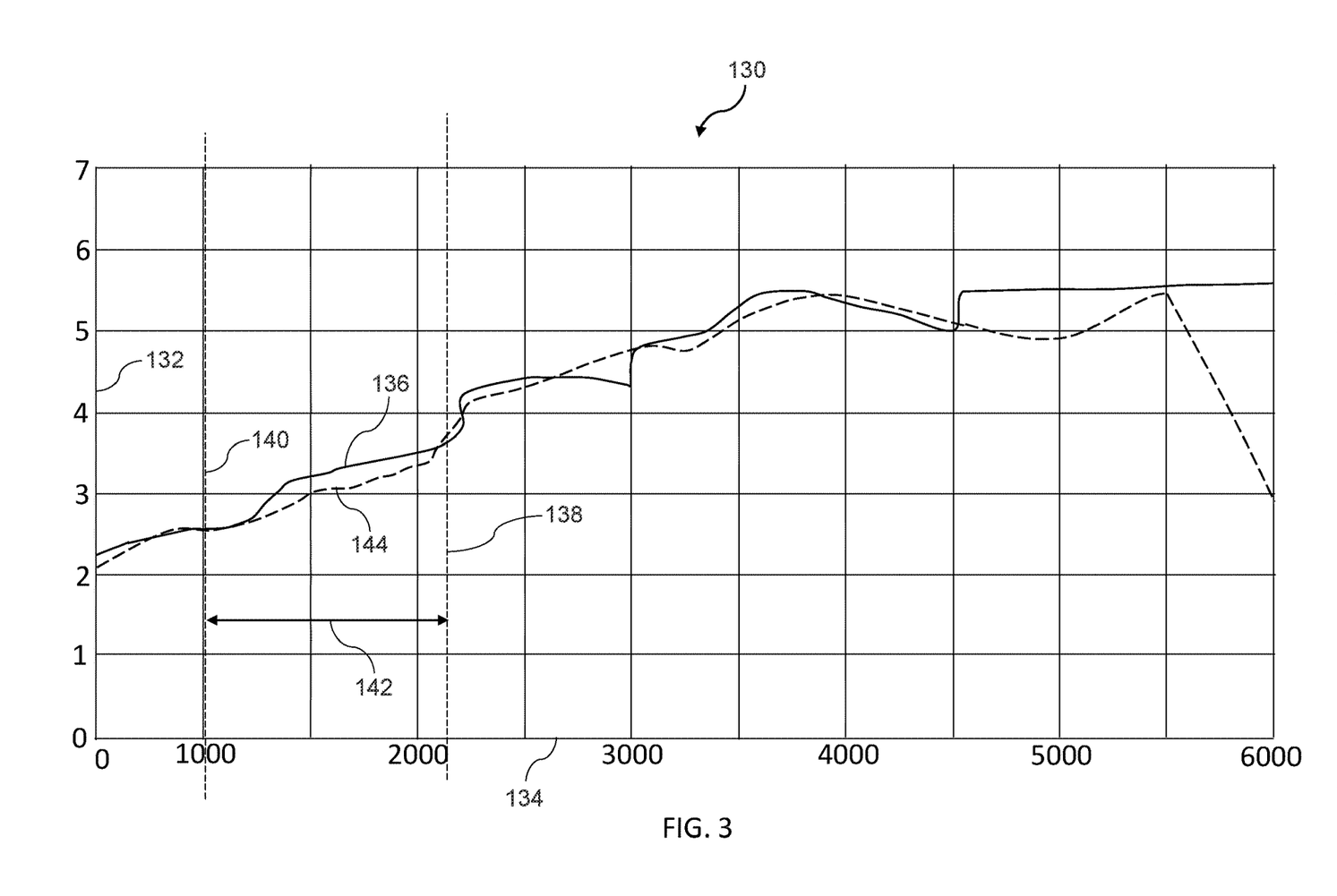
FIG. 3 is a graph of engine torque in increasing magnitude above the origin but without units on the vertical axis, versus engine speed in revolutions per minute on the horizontal axis, demonstrating torque limiting, in accordance with various embodiments.

Referring to FIG. 3, an engine map 130 of torque versus speed is illustrated for the internal combustion engine 26. Torque of the internal combustion engine 26 is shown on the vertical axis 132 in a non-unitized proportional scale of increasing torque when moving upward form the origin. Speed of the internal combustion engine 26 is shown on the horizontal axis 134 in revolutions-per-minute (RPM). The hybrid control module 114, without input from the purge control module 106, produces operating points for the internal combustion engine 26 based on maximizing overall efficiency of the hybrid propulsion system 24 as indicated by the curve 136. Above an upper threshold 138, for example 2200 RPM, efficiency maximization results in the boost device 78 being operated to increase pressure in the intake system 38. Below a lower threshold 140, for example approximately 1000 RPM, operation of the internal combustion engine 26 results in unstable pressure in the intake system 38. Accordingly, a target purge region 142 on the engine map 130 is established for targeting and controlling when EVAP purge takes place. Above the upper threshold 138 where boost is being provided, pressure in the intake system 38 may exceed barometric pressure and so generating vacuum for purge would require disabling boost leading to substantial efficiency reductions in operating the internal combustion engine 26. Accordingly, where torque requirements are higher and at higher RPMs (right of the upper threshold 138 on the engine map 130), that part of the operating space of the internal combustion engine 26 is conceded as far as purge opportunity is concerned. Below the lower threshold 140, pressure in the intake system 38 may be lower than atmospheric but conditions may be undesirable to enact purge. For example, enacting purge may undesirably impact combustion stability of the internal combustion engine 26. Accordingly, the purge control module 106 is programmed to incentivize purges within the target purge region 142 between 1000 RPM and 2200 RPM, for the current internal combustion engine 26. For other applications, the engine speed range may be different and may be determined by computer based modeling and/or characteristic testing.

It has been found as part of the current disclosure that even within the target purge region 142, insufficient ΔP may be present to effectively purge the EVAP system 84. For example, barometric pressure may be 100 kilopascals (KPa) and the most efficient operating points of the internal combustion engine 26 may result in a pressure in the intake system 38 of 97 KPa or greater. A ΔP of at least five KPa may be desirable for EVAP purge, depending on the specific engine application and factoring in efficiency considerations. The ΔP may be increased by lowering the operating points (torque) at which the internal combustion engine 26 is allowed to operate for a given speed in RPM. In the engine map 130 a torque limit has been determined at various engine speeds that results in effective purge without significant efficiency reductions and is illustrated as curve 144. The curve 144 and the torque limits at various RPMs may be determined by modeling using commercially available computational software for high-fidelity simulations verified by targeted testing. Within the target purge region 142, the difference between the torques at curve 136 and the torques at curve 144 have been determined to result in insubstantial efficiency reductions in operation of the propulsion system 24 (such as not greater than 5% reductions). Accordingly, the operating points (torque and speed) are preferably set on the curve 144 for a purge cycle when the engine is operating within the target purge region 142. The effect of those operating points is to provide an effective ΔP for EVAP purge.

Figure 4:
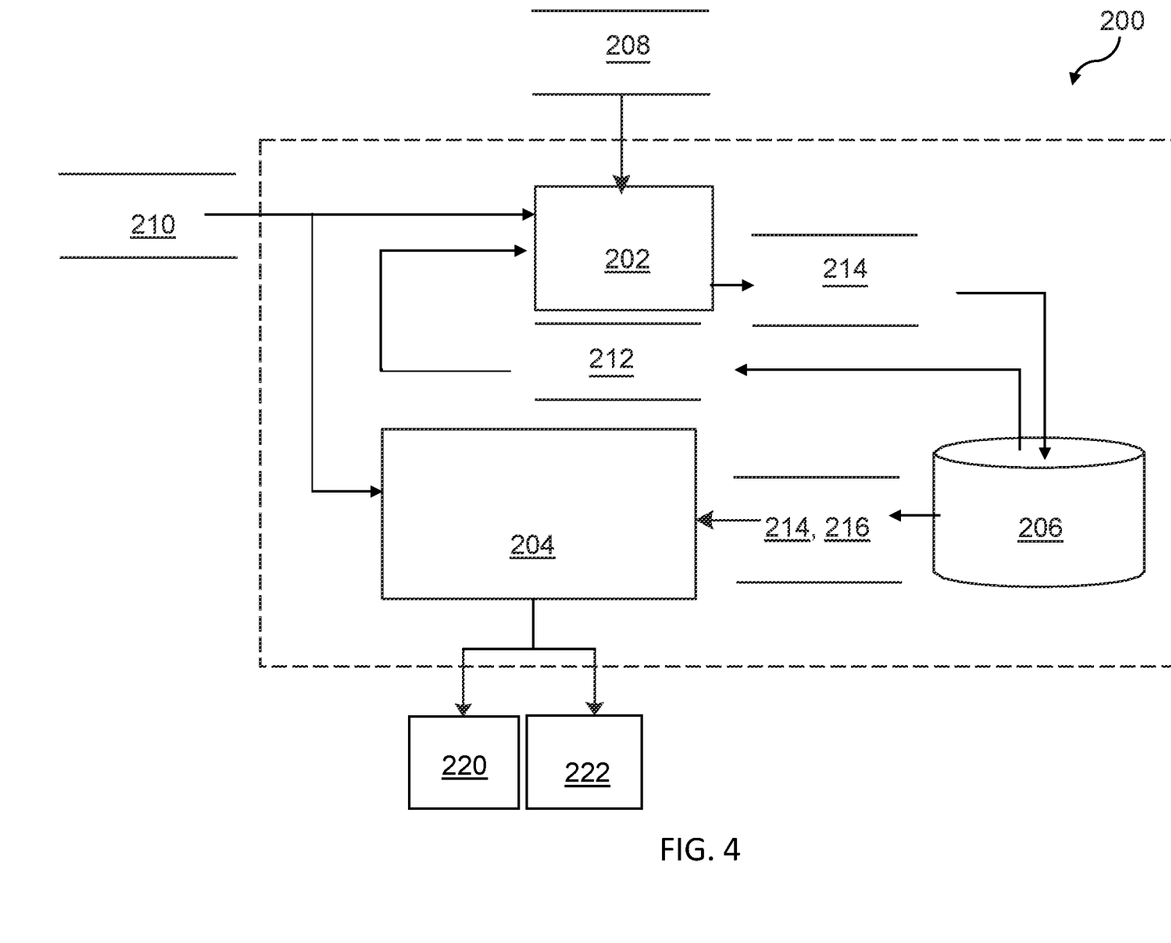
FIG. 4 is a dataflow diagram illustrating control aspects of the evaporative emission purge control system of FIGS. 1 and 2, in accordance with various embodiments.

Referring to FIG. 4, a dataflow diagram illustrates elements of the EVAP purge control system 20 of FIG. 1, in accordance with various embodiments. As will be appreciated, various embodiments of the EVAP purge control system 20 according to the present disclosure may include any number of modules embedded within the controller 50 or in multiple controllers, which may be combined and/or further partitioned to implement the systems and methods described herein. Inputs to the EVAP purge control system 20 may be received from various sensors of the vehicle 22, from the EVAP control module 104, from other control modules (not shown) associated with the vehicle 22, and/or determined by other sub-modules (not shown) within the controller 50. Aspects of the controller 50 of the electronic control system 34 involved in operating the internal combustion engine 26 may be illustrated along with the EVAP purge control system 20 and are generally carried out by operation of the relevant hardware, such as by the controller 50, or by multiple controllers, with input from various sensors and through various actuators of the vehicle 22. For simplicity, descriptions may refer to one controller 50, which means one or more controllers, including in the claims. The EVAP purge control system 20 may be configured to include a strategy determination module 202, an operating point selection module 204, and a datastore 206. Inputs may be received including EVAP state data 208 generated by the EVAP control module 104 of FIG. 2 and sensed data 210. Outputs from the purge control system 20 may include torque 220 and speed 222 operating point settings for the internal combustion engine 26.

In various embodiments, the strategy determination module 202 receives as input sensed data 210 and EVAP state data 208. The EVAP state data 208 includes data that defines the state of the EVAP system 84. For example, in various embodiments, the EVAP state data 208 includes data defining the pressure in the EVAP system 84, historical purge data, and operational data of the purge valve 92.

A hybrid controller typically operates for optimal efficiency of the system including its primary power options, the internal combustion engine 26 and the electric machine 28 and the motor. Operating the internal combustion engine 26 at maximum efficiency may lead to a relatively narrow band of operating points as compared to applications where an engine is the sole source of propulsion for the vehicle 22. Within that relatively narrow band, opportunities for effective EVAP purge may be scarce. Accordingly, in select conditions incentives are applied to move the operating points of the internal combustion engine 26 to support effective purge. When purge is indicated, rather than always effecting a hard torque constraint that forces the internal combustion engine 26 to operate under conditions that support purge, the hybrid control module 114 may be incentivized to move the operating points to comply with torque limits. Under certain conditions, the applied strategy includes incentivized torque limits may be exceeded when overriding factors call for operation of the internal combustion engine 26 above the limits within the balance of the cost based approach.

The strategy determination module 202 processes the data to determine a strategy for purge of the EVAP system 84. In various embodiments, when EVAP system 84 diagnostics are needed, the strategy determination module 202 imposes hard torque limits globally, without regard to the operating speed of the internal combustion engine 26. When EVAP purge is not incipiently needed or when EVAP purge is indicated as needed soon and the internal combustion engine 26 is operating at speeds outside the target purge region 142, standard costs are applied to standard operating point selection, meaning the internal combustion engine 26 will generally be operated at its most efficient points, which may limit or preclude purge opportunities. When EVAP purge is indicated as needed soon and the internal combustion engine 26 is operating at speeds within the target purge region 142, at soft torque limits with added costs applied to the operating point selection, meaning the internal combustion engine 26 will generally be operated at purge favorable points, creating purge opportunities.

The strategy determination module 202 records the selected strategy as selection data 214, such as in the datastore 206. The operating point selection module 204 accesses the selection data 214, along with cost model data 216, such as from the datastore 206. The operating point selection module 204 processes the selection data 214 and the cost model data 216 to determine engine torque 220 and engine speed 222 operating points for the internal combustion engine 26. As noted above, the operating point selection for the internal combustion engine 26 may fall into any of three outcomes (hard/standard/soft) depending on a state of the EVAP system 84.

Figure 5:
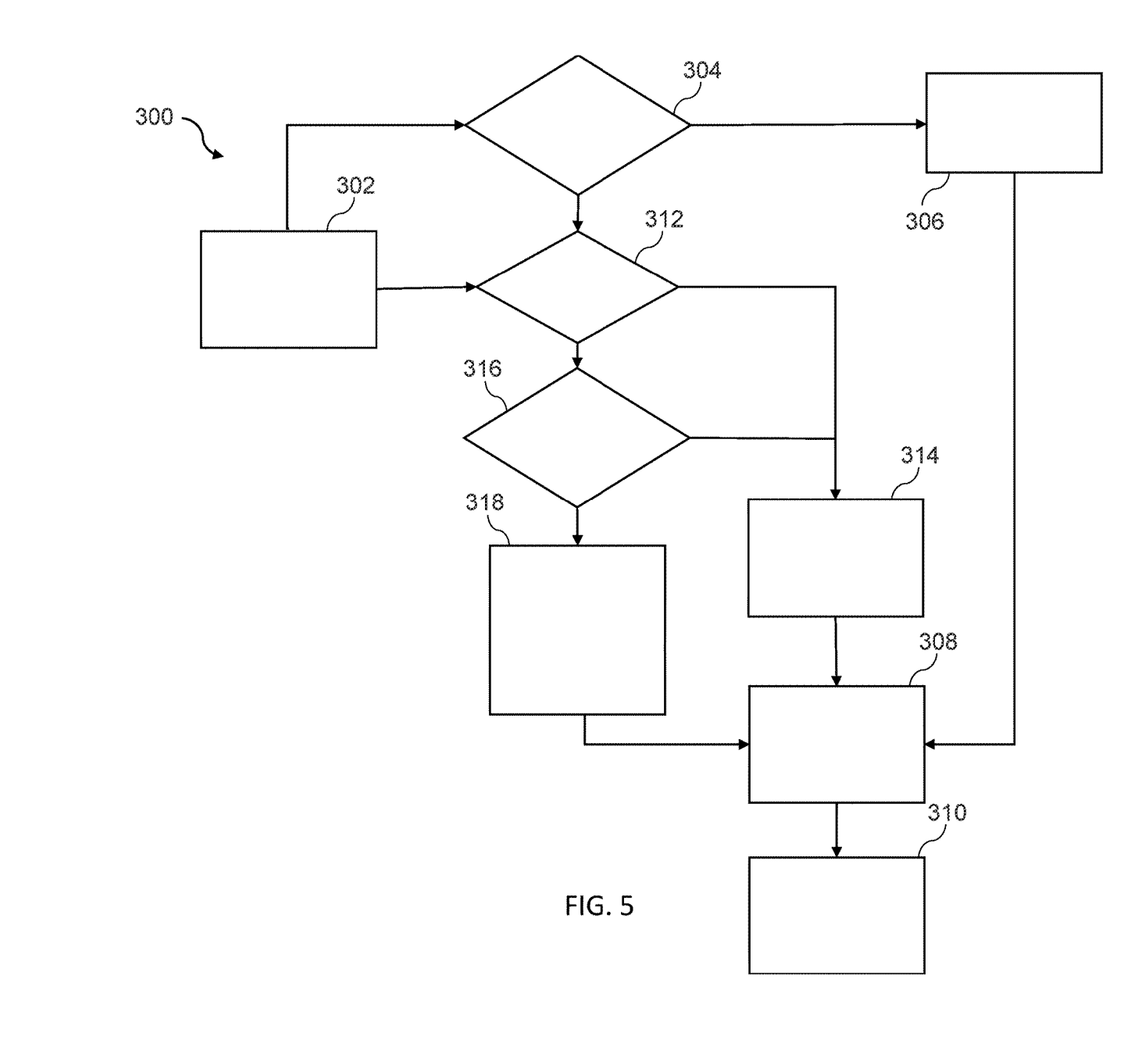
FIG. 5 is a flowchart of a process for implementing a part of the evaporative emission purge control system of FIG. 1, in accordance with various embodiments.

Referring to FIG. 5 along with FIGS. 3 and 4, a process 300 for EVAP purge control is illustrated in flow chart form. It will be appreciated that the methods and systems may vary from those depicted in the Figures and described herein. The EVAP state data 208 from the EVAP control module 104 and the sensed data 210 from the sensors such as the pressure sensor 56 are provided from EVAP system monitoring 302, such as to the strategy determination module 202. The strategy determination module 202 processes EVAP state data 208 and the sensed data 210 and determines 304 whether an intrusive (hard) engine torque limit is required for the current operating conditions of the internal combustion engine 26. The strategy determination module 202 is supplied with strategy model data 212, such as from the datastore 206, to direct selection of the appropriate strategy. The strategy model data 212 may be determined using computer based modeling and/or characteristic testing and may be stored in digitized table or map form. For example, pressure readings from the pressure sensor 56 may indicate that a diagnostic routine is needed. Specifically, the pressure readings may vary abnormally, such as over an excessively broad range. When a diagnostic routine is indicated, the determination 304 is positive, meaning intrusive torque limits are needed. The process 300 proceeds to apply 306, such as by the strategy determination module 202, intrusive torque limits 220 for the selected operating points of the internal combustion engine 26, without efficiency optimization, to globally limit maximum torque output of the internal combustion engine 26 across all operating speeds (RPMs), including those outside the target purge region 142. The intrusive torque limits may be communicated to the datastore 206 via selection data 214. In essence, the internal combustion engine 26 is forced to conform to hard torque limits, such as at curve 144 across all operating speeds regardless of efficiency. Deviating from efficient operation may be necessary when purge is immediately needed and/or when diagnostics are indicated/immediately needed, such as when characteristics of a leak arise. Globally lowering the operating points of the internal combustion engine to a hard torque limit at the curve 144 leads to a $\Delta P$ that supports effective purge regardless of the location of the operating speed on the engine map 130. For example, at speeds above 2200 RPM, operation of the boost device 78 that would otherwise be effected may be stopped or reduced, leading to substantial efficiency reductions to effect EVAP purge. The determination 202, embodied in the selection data 214, is delivered to, and stored in, the datastore 206 and available to the operating point selection module 204 along with cost model data for the determination 308. The process 300 performs operating point selection 308, such as by the operating point selection module 204, which may be effected by the hybrid control module 114, using the selection data 214 and the cost model data 216. In this case the cost model data 216 imposes the hard torque threshold of the curve 144. The process 300 proceeds to execute 310 the torque and speed operating points, such as through the engine control module 108.

Returning to the determination 304, when an intrusive torque limit is not required, meaning the determination 304 is negative, the process 300 proceeds to determine 312 whether EVAP purge is needed. For example, the EVAP state data 208 may indicate that a purge cycle was recently completed. In such a case, the determination 310 is negative and the process 300 proceeds to apply 314 standard costing for operating points of the internal combustion engine 26. In other words, the purge control module 106, communicates to the hybrid control module 114 that the most efficient operating points may be applied 314, and the curve 136 is used to set the torque output of the internal combustion engine 26. The result is that instead of the applied 306 intrusive torque limits being effected, the applied 314 standard torque limits may be effected by the hybrid control module 114, which is programmed to apply the most efficient operating points to the internal combustion engine 26 without being forced or incentivized to deviate therefrom. As a result, opportunities for purge may be significantly limited. The process 300 performs operating point selection 308, such as by the operating point selection module 204 and the hybrid control module 114, using the selection data 214 and the cost model data 216. In this case the cost model data 216 does not impose a hard torque threshold but instead selects operating points based on efficiency on the curve 136. The process 300 proceeds to execute 310 the torque and speed operating points, such as through the engine control module 108.

Returning to the determination 312 as to whether EVAP purge is indicated, when the determination is positive, meaning EVAP purge will be needed soon, the process 300 proceeds to determine 316 whether the internal combustion engine 26 is operating within the target purge region 142. For example, the strategy determination module 202 with input from the sensed data 210, including from the engine speed sensor 62, determines whether the speed is within the range 1000 RPM-2200 RPM. When the determination 316 is negative, meaning the speed is not within the target purge region 142, the process 300 applies 314 standard costing for operating points of the internal combustion engine 26. With the standard costing applied, the process 300 proceeds to perform efficiency optimizing operating point selection 308 (e.g. from the curve 136) and execute 310 the torque and speed operating points.

Returning to the determination 316, when the outcome is positive and the internal combustion engine 26 is operating within the target purge region 142 such as within the 1000 RPM-2200 RPM speed range, the process 300 proceeds to apply 318 soft torque limits with an additional cost factor, such as communicated via the selection data 214. Additional costs are added to engine torque values above the maximum desired purge line of curve 144. Operating points above curve 144 are given a cost that is equal to the distance above curve 144 multiplied by a calibratable cost factor. This is done to encourage the hybrid control module 114 to select points at or below curve 144, as they will allow for purge to occur. For example, at an engine speed of 2000 RPM, the value of curve 144 may be 100 Newton-meters (Nm), and the cost factor is 1. If the hybrid control module 114 chooses an engine torque of 110 Nm for example, it will incur a soft cost of (110-100)*1=10. Curve 144 may be calibrated to change as a function of barometric pressure. At lower barometric pressures, curve 144 may be moved downward to target the same $\Delta P$ (e.g. 5 kPa).

The additional cost factor may be determined using commercially available simulation software verified by targeted testing over possible speeds of the internal combustion engine 26. The additional cost factor may be a linear gain type of addition that incentivizes departure from the most efficient operation torque of curve 136 to move to the curve 144. The result is to create opportunities for purge to occur when the internal combustion engine 26 is operating within the target purge region 142 by incentivizing the modified torque values resulting in a sufficient $\Delta P$ (e.g. 5 kPa) for effective purge. The modified torque values may result is slightly less efficient operation of the internal combustion engine 26 but since the boost device is not providing boost, the efficiency reduction, if any, will by insubstantial (e.g. 5% or less). Incentivizing a torque modification means that an added factor in the hybrid control cost function is weighted to impose a soft torque limit for engine operating point selection so that the hybrid control module 114 selects operating points on the curve 144 unless a factor with greater weight takes priority and forces the selection of the most efficient point on the curve 136. The magnitude of the change in torque varies depending on the speed of the internal combustion engine 26 as shown in FIG. 3. To avoid the added factor in the cost function, the hybrid control module 114 selects operating points at the curve 144. The factor has a linear gain meaning that moving further away from the curve 144 imposes a higher cost. When applying the cost factor and the operating torque to enable purge, the cost factor is set to optimize against all cost function costs, including fuel efficiency/economy. Overriding factors, such as drive quality of the vehicle 22, and/or stable operation of the internal combustion engine 26, are weighted higher than the added factor, which when present move the operating points back to the curve 136.

Applying 318 an additional cost factor to the operating point selection for the internal combustion engine 26 is communicated to the operating point selection module in the selection data 214. The process 300 proceeds to perform operating point selection 308, such as by the operating point selection module 204 and the hybrid control module 114, using the selection data 214 and the cost model data 216. In this case the cost model data 216 does impose a soft torque threshold incentivizing the selection of operating points based on efficiency on the curve 144. The process 300 proceeds to execute 310 the torque and speed operating points, such as through the engine control module 108. The soft torque threshold results in favorable ΔP purge opportunity unless an overriding factor takes precedence.

With the internal combustion engine 26 operating in the target purge region 142 and at the favorable operating points of the curve 144, the controller 50 operates the purge valve 92 to open and fuel vapors are drawn from the canister 86 through the intake system 38 and consumed in the internal combustion engine 26. The controller 50 may compare the pressure reading from the MAP sensor 54 to that of the atmospheric pressure sensor 58 to confirm a sufficient pressure differential for effective purge, prior to opening the purge valve 92. For example, the controller 50 may confirm that the ΔP is at least 5 kPa.

Accordingly, systems and methods create favorable EVAP purge opportunities that would not otherwise exist under pure efficiency driven control of a hybrid propulsion system. The opportunities are created within a defined speed region of the internal combustion engine, which may be a boosted engine. Creating additional purge opportunities as describe herein is beneficial in hybrid propulsion systems, including those with boosted engines, where manifold air pressures may exceed atmospheric barometric pressures where purge opportunities otherwise are limited or do not exist.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An evaporative emission purge control system comprising:
an evaporative emission control system configured to collect fuel vapor; and
a controller configured to:
determine whether an operating speed of an internal combustion engine is within a target purge region of the evaporative emission control system, where the target purge region is bounded by a lower speed threshold of the internal combustion engine and an upper speed threshold of the internal combustion engine;
apply, when the operating speed of the internal combustion engine is within the target purge region, a cost factor to operating points for the internal combustion engine; and
set, when an operating speed of the internal combustion engine is within the target purge region and based on the cost factor, the operating points to include an operating torque for the internal combustion engine to generate an intake pressure of the internal combustion engine at a level below atmospheric pressure for a purge of the evaporative emission control system.

2. The evaporative emission purge control system of claim 1, comprising an atmospheric pressure sensor coupled with the controller, wherein the operating torque is set so that the intake pressure is lower than a barometric pressure sensed by the atmospheric pressure sensor.

3. The evaporative emission purge control system of claim 1, wherein the controller is configured:
to set, when the operating speed is not within the target purge region, the operating torque to maximize fuel efficiency of the internal combustion engine; and
to select, when applying the cost factor and the operating torque to enable purge, the cost factor to optimize against all cost function costs, including fuel efficiency.

4. The evaporative emission purge control system of claim 1, comprising a purge valve disposed to control a flow from the evaporative emission control system to an intake system of the internal combustion engine, wherein the controller is configured to open the purge valve when the operating speed is within the target purge region and the intake pressure is effective for a purge of the evaporative emission control system.

5. The evaporative emission purge control system of claim 1, wherein the controller is configured to determine whether a diagnostic check of the evaporative emission control system is indicated, and when the diagnostic check is indicated, to set the operating torque for the internal combustion engine to result in the intake pressure at the level for a purge of the evaporative emission control system independent of the operating speed.

6. The evaporative emission purge control system of claim 1, wherein the operating torque is set based on a cost function, wherein the operating torque is set to result in the intake pressure being too high for a purge of the evaporative emission control system when a precedential cost factor takes precedence over a purge incentivizing cost factor.

7. The evaporative emission purge control system of claim 6, wherein the purge incentivizing cost factor is weighted to incentivize purge of the evaporative emission control system, wherein the precedential cost factor is weighted to result in stable operation of the internal combustion engine.

8. The evaporative emission purge control system of claim 1, comprising a boost device operable to selectively increase the intake pressure, wherein the controller is configured to operate the boost device only when the operating speed is outside the target purge region.

9. The evaporative emission purge control system of claim 1, comprising:
a vehicle propulsion system, with the internal combustion engine included in the vehicle propulsion system; and
an electric machine included in the vehicle propulsion system,
wherein the controller is configured to apportion an overall torque of the propulsion system between the electric machine and the internal combustion engine.

10. The evaporative emission purge control system of claim 1, wherein the controller is configured to set the operating torque at a constrained level when the operating speed is within the target purge region, wherein the constrained level is set to lower the operating torque to decrease the intake pressure.

11. A method of controlling evaporative emission purge, the method comprising:
determining, by a controller, whether an operating speed of an internal combustion engine is within a target purge region of an evaporative emission control system configured to collect fuel vapor, where the target purge region is bounded by a lower speed threshold of the internal combustion engine and an upper speed threshold of the internal combustion engine;
applying, when the operating speed of the internal combustion engine is within the target purge region, a cost factor to operating points for the internal combustion engine, and
setting, when an operating speed of the internal combustion engine is within the target purge region and based on the cost factor, the operating points to include an operating torque for the internal combustion engine to generate an intake pressure of the internal combustion engine at a level below atmospheric pressure for a purge of the evaporative emission control system.

12. The method of claim 11, comprising setting, by the controller with an input from an atmospheric pressure sensor, the operating torque so that the intake pressure generated is lower than a barometric pressure sensed by the atmospheric pressure sensor.

13. The method of claim 11, comprising setting, by the controller and when the operating speed is not within the target purge region, the operating torque to maximize fuel efficiency of the internal combustion engine.

14. The method of claim 11, comprising:
controlling, by a purge valve, a flow from the evaporative emission control system to an intake system of the internal combustion engine; and
opening, by the controller, the purge valve when the operating speed is within the target purge region and the intake pressure is effective for a purge of the evaporative emission control system.

15. The method claim 11, comprising:
determining, by the controller, whether a diagnostic check of the evaporative emission control system is indicated; and
setting, by the controller and when the diagnostic check is indicated and independent of the operating speed, the operating torque for the internal combustion engine to result in the intake pressure being effective for a purge of the evaporative emission control system.

16. The method of claim 11, comprising:
determining, by the controller and based on a cost function, the operating torque;
determining, by the controller, whether a precedential cost factor takes precedence over a purge incentivizing cost factor; and
setting, by the controller and when the precedential cost factor takes precedence over the purge incentivizing cost factor, the operating torque to result in the intake pressure being ineffective for a purge of the evaporative emission control system.

17. The method of claim 16, comprising:
weighting the purge incentivizing cost factor to incentivize purge of the evaporative emission control system; and
weighting the precedential cost factor to result in stable operation of the internal combustion engine.

18. The method of claim 11, comprising:
selectively increasing, by a boost device, the intake pressure; and
operating, by the controller, the boost device only when the operating speed is outside the target purge region.

19. The method of claim 11, comprising:
including the internal combustion engine in a vehicle propulsion system;
including an electric machine in the vehicle propulsion system,
apportioning, by the controller, an overall torque of the propulsion system between the electric machine and the internal combustion engine.

20. An evaporative emission purge control system comprising:
an internal combustion engine configured to operate at an operating torque within a range of torques and at an operating speed within a range of speeds, the internal combustion engine having an intake system with an intake pressure;
a fuel system coupled with the internal combustion engine;
an evaporative emission control system coupled with the fuel system and configured to collect fuel vapor; and
a controller configured to:
determine whether a diagnostic check of the evaporative emission control system is indicated;
determine whether a purge of the evaporative emission control system is indicated;
determine whether the operating speed is within a target purge region;
when the diagnostic check is indicated and independent of the operating speed, set the operating torque for the internal combustion engine to result in the intake pressure being effective for a purge of the evaporative emission control system;
when the purge of the evaporative emission control system is indicated and the operating speed is within the target purge region, set the operating torque for the internal combustion engine to generate the intake pressure at a level effective for a purge of the evaporative emission control system.

* * * * *